(12) United States Patent
Godwin

(10) Patent No.: US 6,561,593 B2
(45) Date of Patent: May 13, 2003

(54) LOCKING HUB AND WHEEL ASSEMBLY

(76) Inventor: Craig Richard Godwin, 5654 Eastview St., Louisville, OH (US) 44641

( * ) Notice: Subject to any disclaimer, the term of this patent is extended or adjusted under 35 U.S.C. 154(b) by 0 days.

(21) Appl. No.: 09/970,210

(22) Filed: Oct. 2, 2001

(65) Prior Publication Data

US 2002/0038973 A1 Apr. 4, 2002

Related U.S. Application Data

(60) Provisional application No. 60/237,857, filed on Oct. 4, 2000.

(51) Int. Cl.[7] .............................................. B60B 37/00
(52) U.S. Cl. ................... 301/111.04; 301/111
(58) Field of Search .......................... 301/111, 105.1, 301/122, 108.3, 112, 119, 121, 111.01, 111.03, 131, 111.04, 113, 120, 111.07, 132; 403/315, 316, 317, 319, 350, 351

(56) References Cited

U.S. PATENT DOCUMENTS

| | | | |
|---|---|---|---|
| 351,425 A | * 10/1886 | Coleman | .................... 301/120 |
| 1,540,508 A | 6/1925 | White | |
| 2,226,098 A | 12/1940 | Hedstrom | |
| 2,615,759 A | 10/1952 | Becker | |
| 2,778,159 A | 1/1957 | Irwin | |
| 3,870,371 A | * 3/1975 | Solomon | ........................ 301/1 |
| 3,998,560 A | * 12/1976 | Damour | .................... 242/598.4 |
| 4,043,685 A | 8/1977 | Hyams | |
| 4,193,639 A | * 3/1980 | Pauly et al. | ............. 301/35.61 |
| 4,913,610 A | 4/1990 | Olivieri | |
| 5,188,430 A | * 2/1993 | Chiu | ..................... 301/111.01 |
| 5,215,356 A | 6/1993 | Lin | |
| 5,222,786 A | 6/1993 | Sovis et al. | |
| 5,277,480 A | 1/1994 | Chiu | |
| 5,358,314 A | 10/1994 | Spadotto | |
| 5,368,371 A | 11/1994 | Markling | |
| 5,556,224 A | * 9/1996 | Niskanen | ..................... 403/324 |
| 5,716,107 A | 2/1998 | Parker et al. | |
| 5,884,982 A | 3/1999 | Yemini | |
| 5,902,018 A | * 5/1999 | Owen et al. | ............. 301/111.04 |
| 5,957,544 A | 9/1999 | Hu | |
| 6,045,188 A | * 4/2000 | Schooler | ....................... 188/67 |
| 6,361,121 B1 | * 3/2002 | Morris | ........................ 301/112 |

* cited by examiner

*Primary Examiner*—S. Joseph Morano
*Assistant Examiner*—Frantz F. Jules
(74) *Attorney, Agent, or Firm*—Sand & Sebolt

(57) ABSTRACT

A locking hub is adapted to connect a wheel to an axle such that the wheel will rotate on the axle. The wheel includes an opening with a pair of retaining ledges extending out into the opening. The locking hub includes a body defining a bore adapted to receive the axle. The bore has a longitudinal axis. The body defines a first slot disposed in a reference plane that intersects the longitudinal axis of the bore. A clip is disposed in the slot with a portion of the clip disposed in the bore and adapted to engage the axle. The body defines a slot adapted to lockingly receive the retaining ledges of the wheel to lock the hub to the wheel.

65 Claims, 16 Drawing Sheets

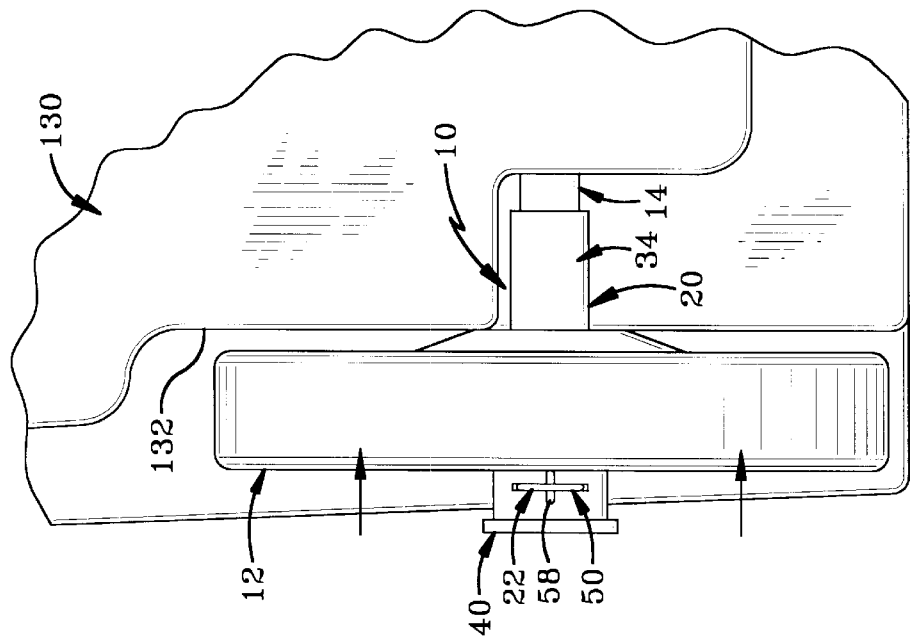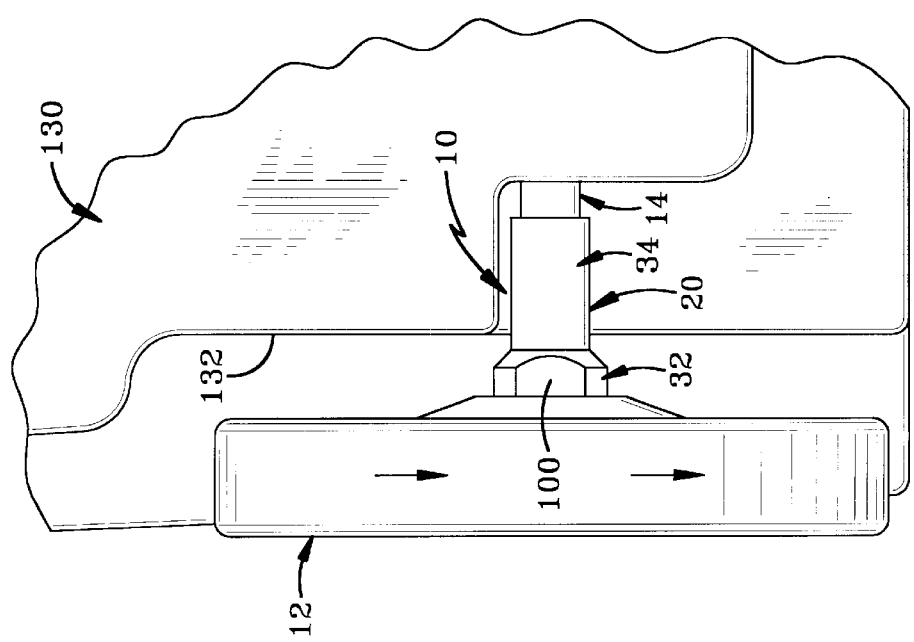

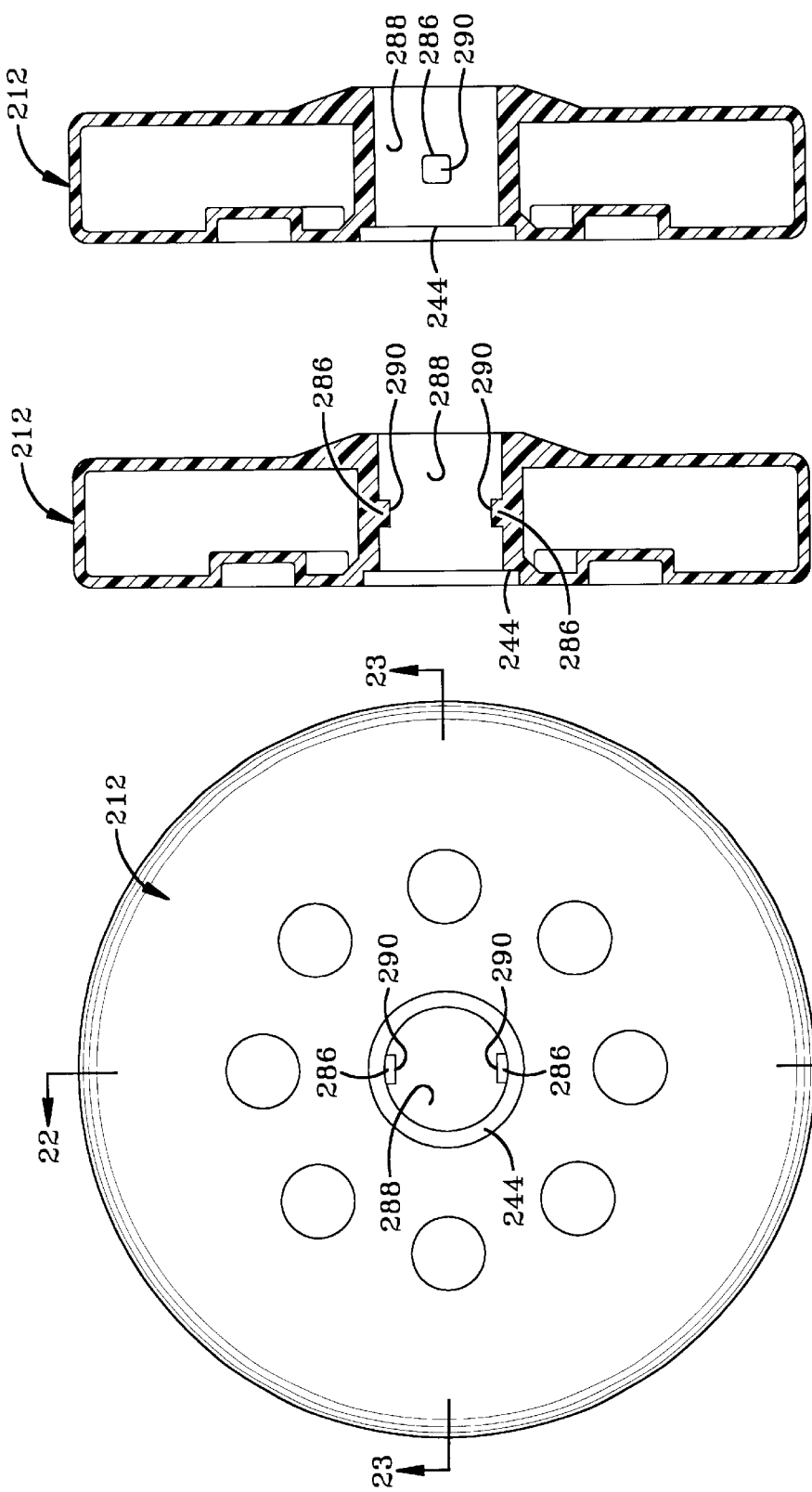

LOCKING HUB AND WHEEL ASSEMBLY

CROSS SECTION TO RELATED APPLICATION

This application claims priority from U.S. Provisional Application Ser. No. 60/237,857 filed Oct. 4, 2000; the disclosures of which are incorporated herein by reference.

BACKGROUND OF THE INVENTION

1. Technical Field

The present invention generally relates to devices that connect a wheel to an axle. More particularly, the present invention relates to a wheel hub having a bayonet-style connection with the wheel and a pinned connection with the axle that cooperate to lock the wheel to the axle in a rotating manner. Specifically, the locking hub and wheel combination are used with a trash can to prevent the wheel from being easily removed from the trash can.

2. Background Information

Numerous applications exist in the art wherein a wheel must be connected to an axle so that the wheel may rotate with respect to the item holding the axle. One such application is waste containers. Many different types of waste containers have wheels that allow the user of the container to tip the container up on the wheels to roll the container from place to place.

One problem with existing connection configurations is that they do not securely connect the wheel to the axle so that the wheels become loose as the container is used. Another problem is that existing connectors allow the wheels to be easily removed. Easily removable wheels are a drawback because the removal of a wheel allows the axle to removed from the container. In some areas of the country, people steal axles from waste containers and sell them for scrap. This is particularly undesirable for the waste collection companies who supply their customers with waste containers. These companies incur significant expenses replacing the stolen axles and replacing the wheels on the axles. The industry thus desires a connector for holding a wheel on an axle that prevents the wheels from being readily removed from the axle. Such a device must be sufficiently rugged to be used on a waste container that will be used outdoors in somewhat rough environments while being heavily loaded. The device must also be easy to install without the use of complicated or unique tools while only being removed with the use of a tool.

One known connector device is disclosed in U.S. Pat. 5,902,018. This device uses flexible cantilevered arms to connect a wheel with an axle. One drawback to this device is that the cantilevered locking fingers can be easily broken when used in a harsh environment. Another drawback is that thieves can use a simple pry bar to remove the device in order to steal the axle of the container.

SUMMARY OF THE INVENTION

The invention provides a locking hub that is adapted to connect a wheel to an axle such that the wheel will rotate on the axle. The hub cooperates with a wheel that defines an opening with a pair of retaining ledges extending out into the opening. The hub includes a body defining a bore adapted to receive the axle wherein the bore has a longitudinal axis. The body of the hub defines a first slot disposed in a reference plane that intersects the longitudinal axis of the bore. A clip disposed in the slot includes a portion disposed in the bore that is adapted to engage the axle. The hub also defines a slot adapted to lockingly receive the retaining ledges of the wheel to lock the hub to the wheel.

The invention provides that the locking hub may be used with a wheel assembly and a waste container.

The invention also provides a method of connecting a wheel to an axle with a locking hub including the steps of inserting a portion of the locking hub into the wheel so that the locking hub is in an unlocked position; rotating the locking hub to a locked position; and connecting the locking hub to the axle.

BRIEF DESCRIPTION OF THE DRAWINGS

FIG. 17A is an elevation view of one of the wheels showing the wheel being rotated with respect to the locking wheel hub assembly.

FIG. 17B is a view similar to FIG. 17A showing the wheel being pushed inwardly to expose the slot that holds the clip.

FIG. 21 is a front elevation view of the wheel that locks to the hub of FIG. 18.

FIG. 22 is a section view taken along line 22—22 of FIG. 21.

FIG. 23 is a section view taken along line 23—23 of FIG. 21.

Similar numbers refer to similar parts throughout the specification.

DESCRIPTION OF THE PREFERRED EMBODIMENTS

Figure 1:
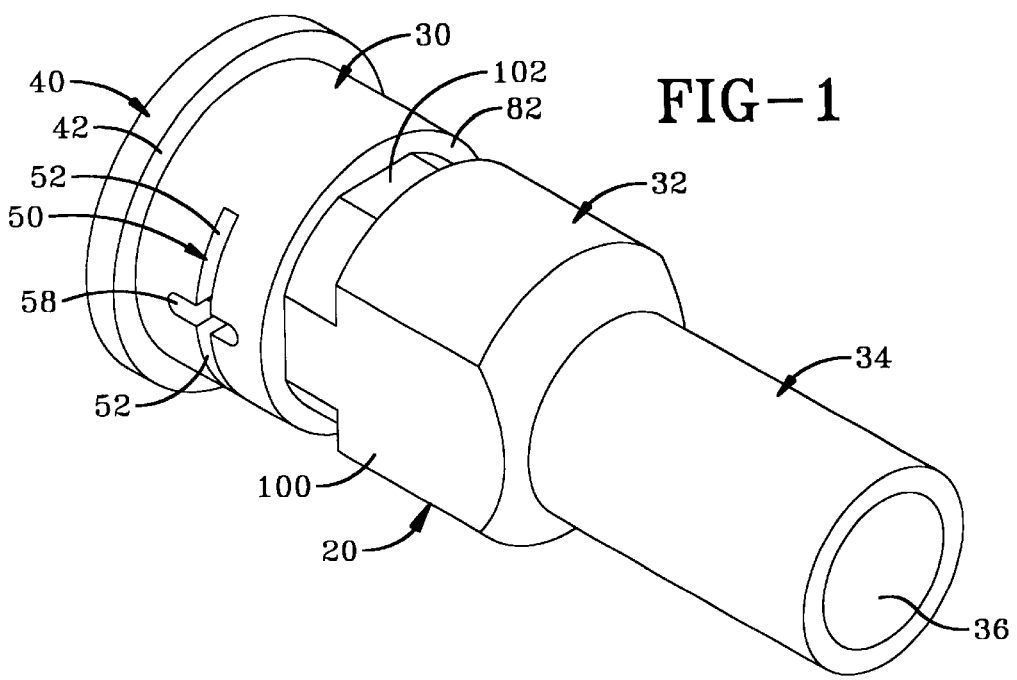
FIG. 1 is a perspective view of the hub of the present invention.
Figure 2:
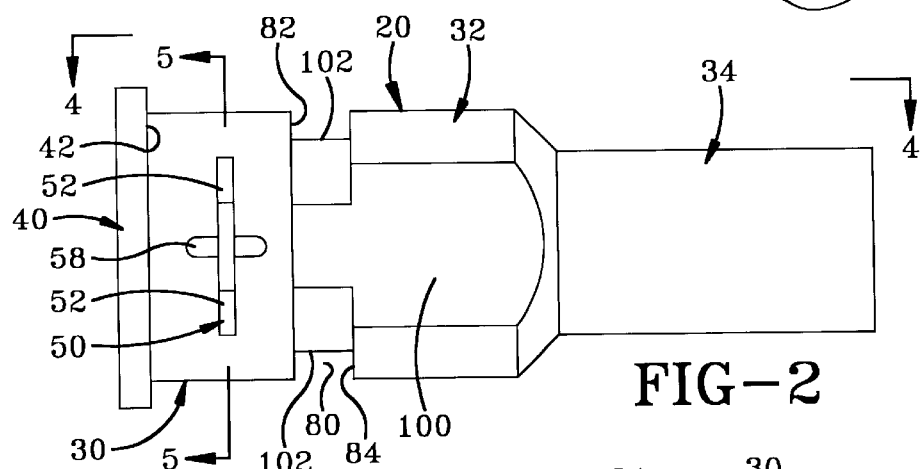
FIG. 2 is a front view of FIG. 1.
Figure 3:
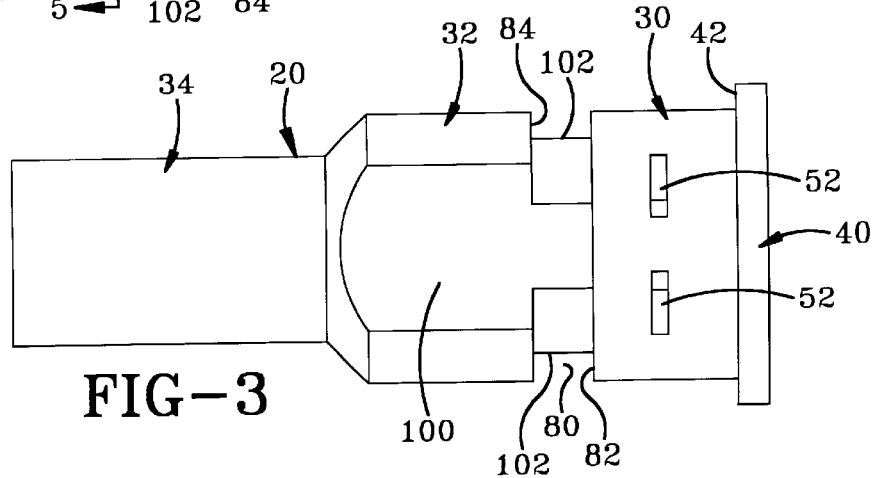
FIG. 3 is a rear view of FIG. 1.
Figure 4:
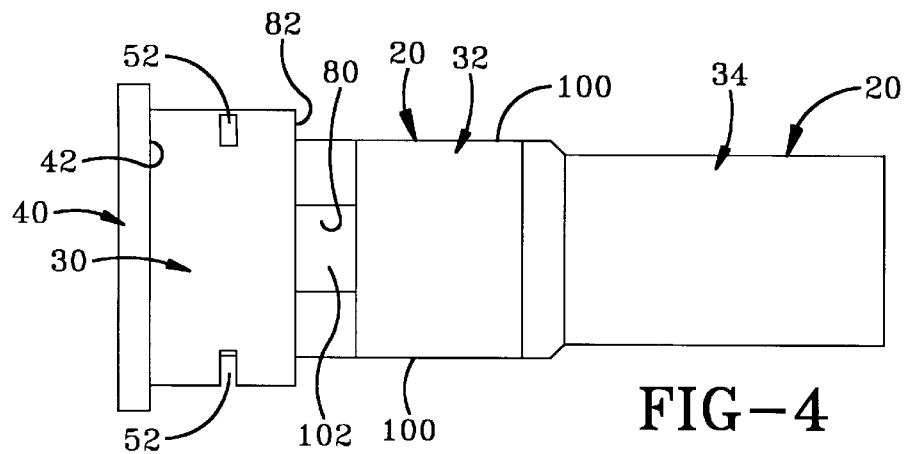
FIG. 4 is a top plan view of FIG. 1.
Figure 5:
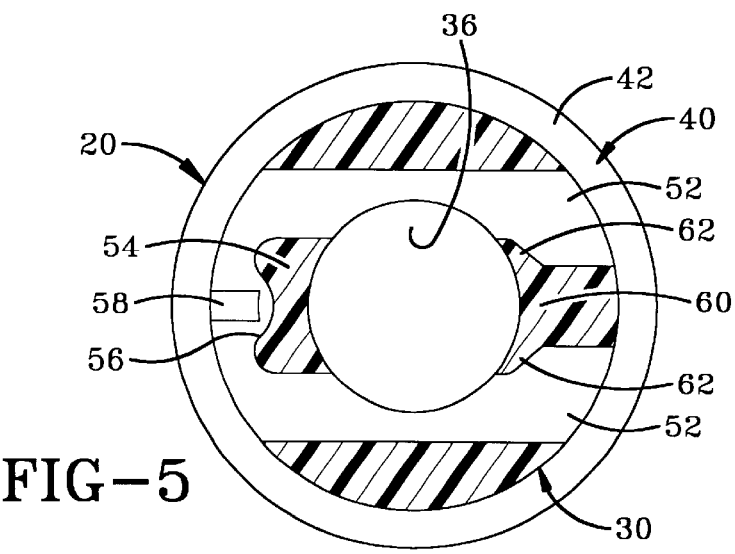
FIG. 5 is a section view taken along line 5—5 of FIG. 2.
Figure 6:
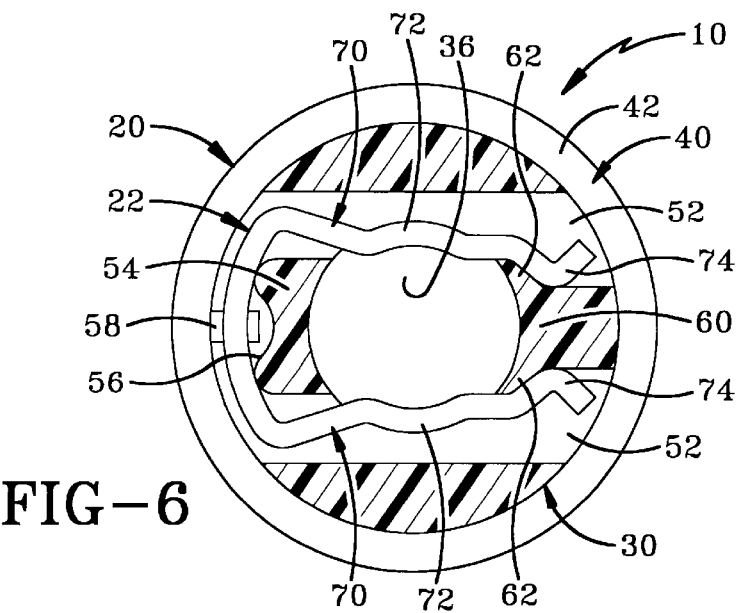
FIG. 6 is a view similar to FIG. 5 showing the clip installed on the hub of FIG. 1.
Figure 8:
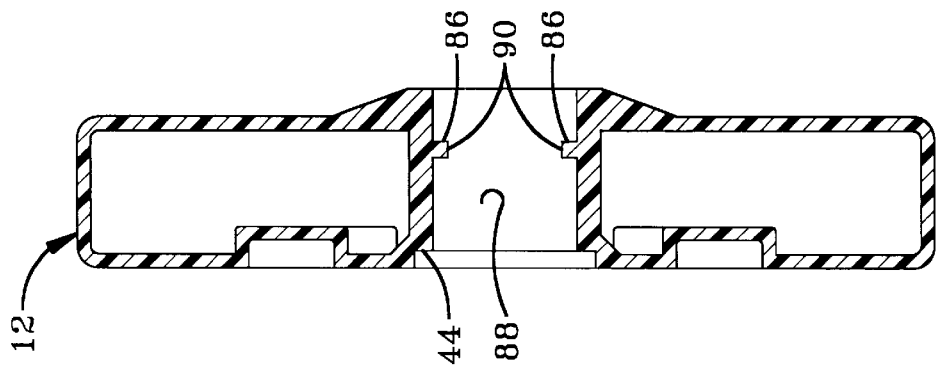
FIG. 8 is a section view taken along line 8—8 of FIG. 7.
Figure 7:
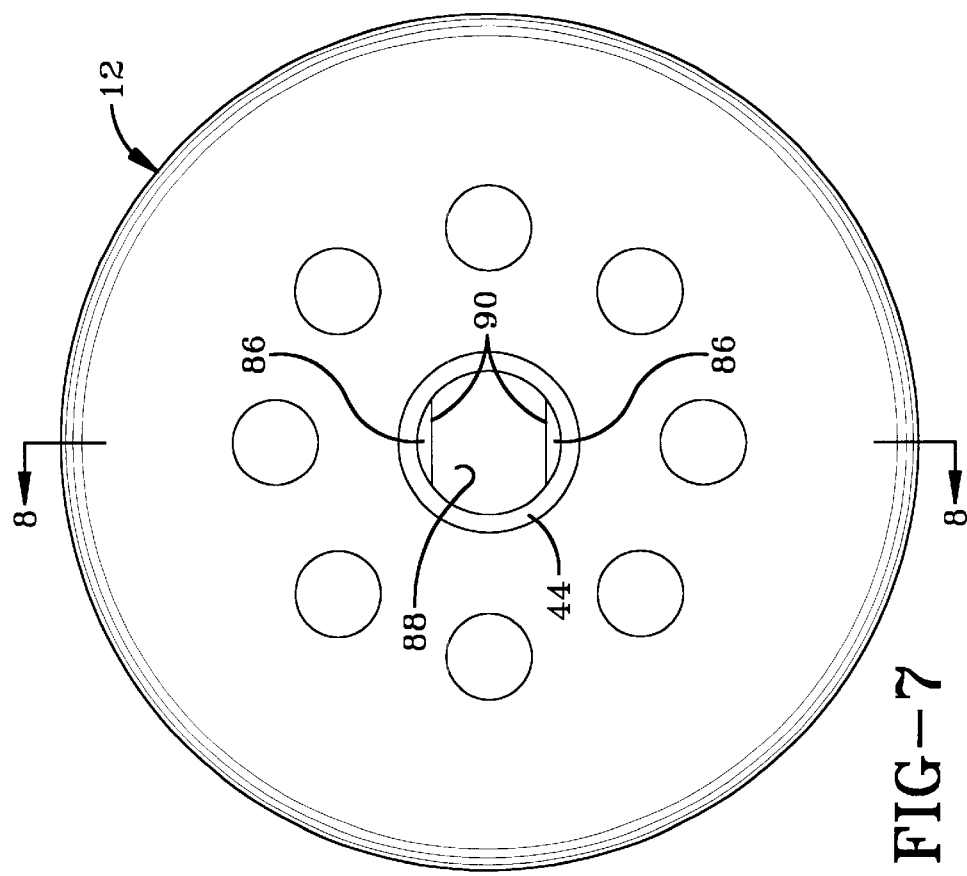
FIG. 7 is a front elevation view of the wheel that locks to the hub of FIG. 1.
Figure 9:
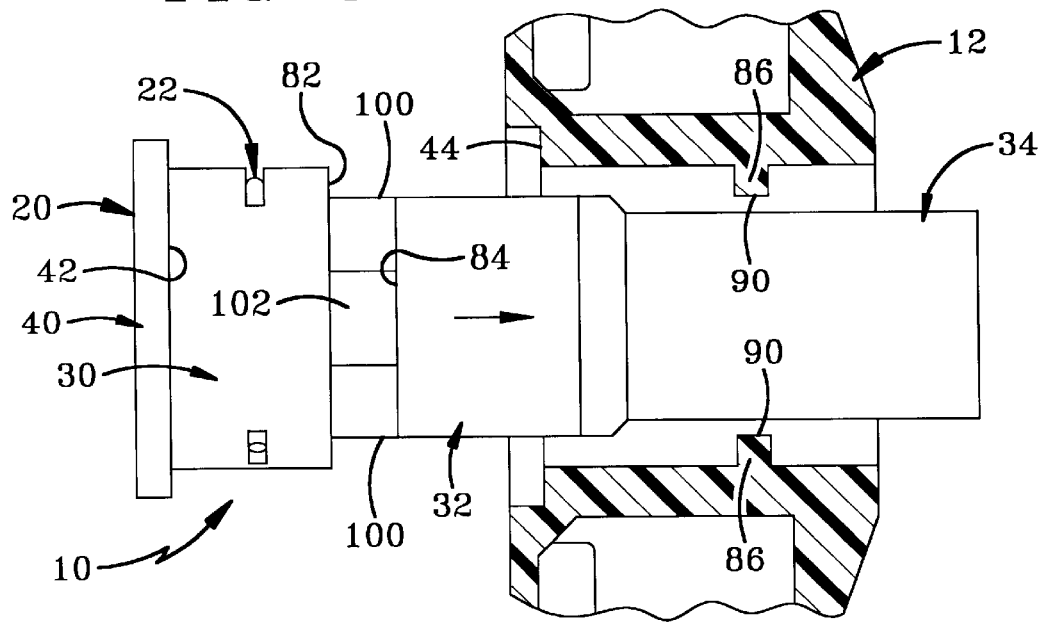
FIG. 9 is a side view, partially in section, of the FIG. 1 hub assembly being installed into the wheel.
Figure 10:
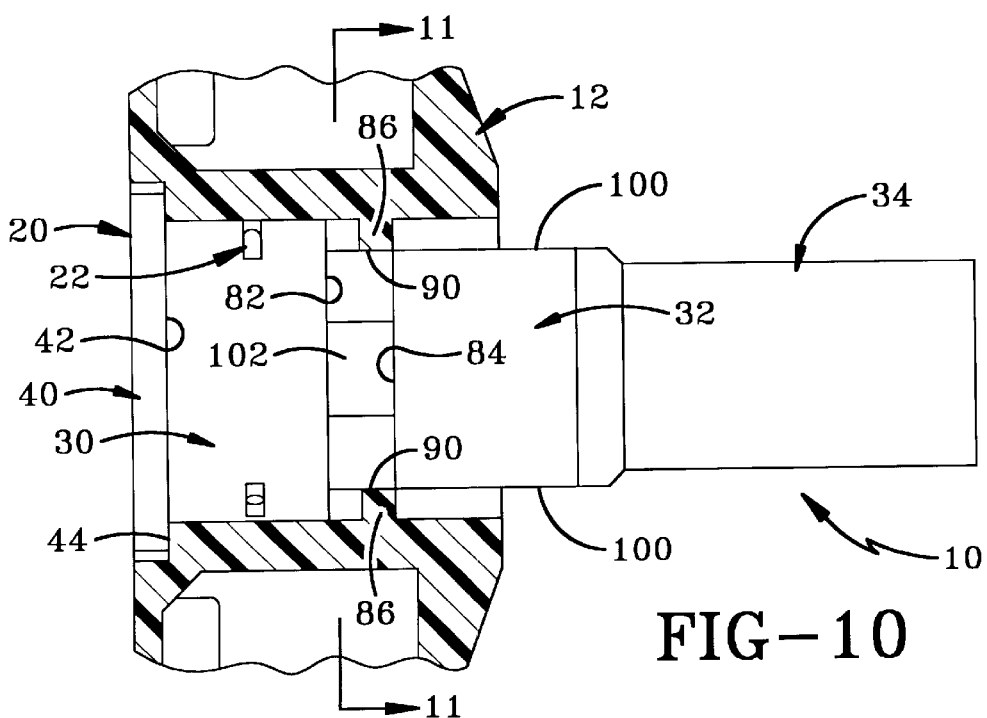
FIG. 10 is a view similar to FIG. 9 showing the hub assembly fully inserted into the wheel.
Figure 11:
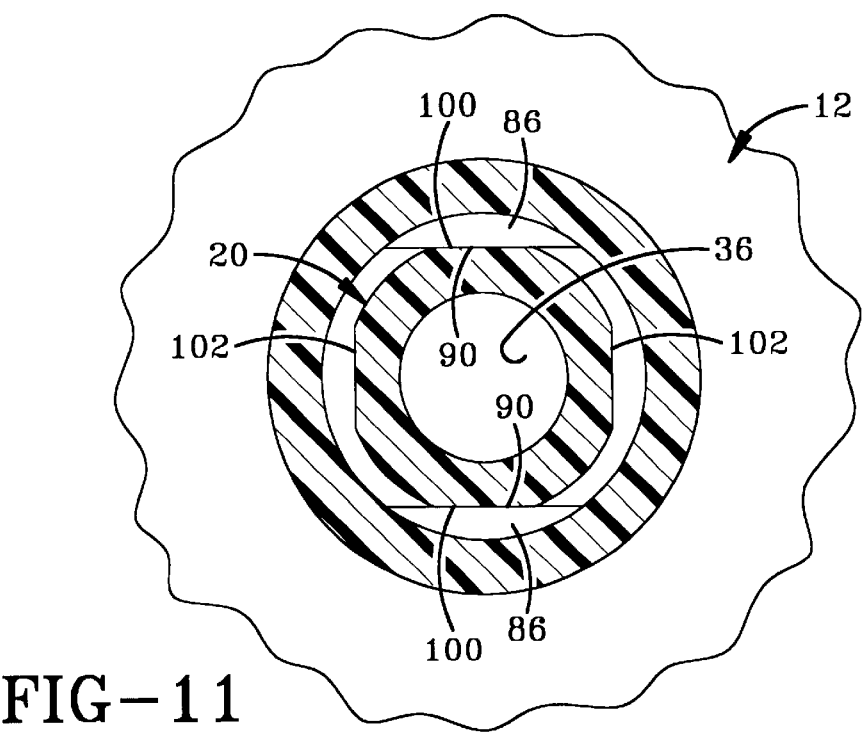
FIG. 11 is a section view taken along line 11—11 of FIG. 10.
Figure 13:
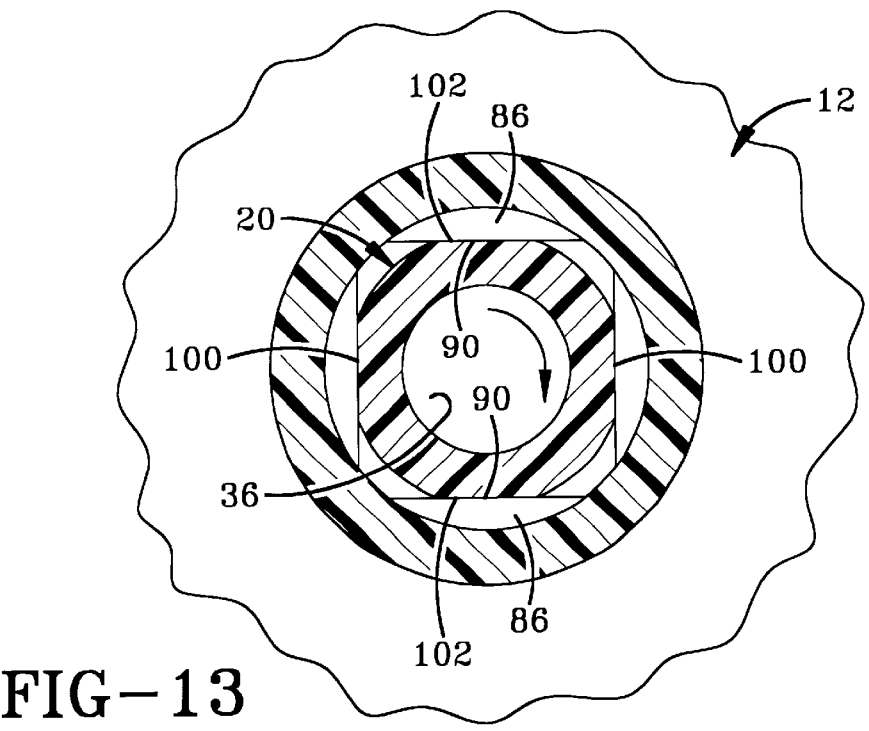
FIG. 13 is a section view taken along line 13—13 of FIG. 12.

The first embodiment of the hub assembly of the present invention is generally indicated by the numeral 10 in the accompanying drawings. Hub assembly 10 is used to hold a wheel 12 on an axle 14 in an arrangement that allows axle 14 to rotate with respect to hub assembly 10 and wheel 12. Hub assembly 10 generally includes a hub 20 and a clip 22. Hub 20 is configured to lock to wheel 12 while clip 22 is configured and arranged to rotatingly connect hub 20 to axle 14.

Hub 20 includes a head portion 30, a body portion 32, and a foot portion 34. Portions 30, 32, and 34 may be integrally fabricated preferably by molding portions 30, 32, and 34 together in a single mold. Hub 20 may be fabricated from plastic or any of a variety of other materials known to those skilled in the art. For instance, hub 20 may be fabricated from metal. Hub 20 also defines an axle bore 36 having a longitudinal centerline.

Head portion 30 includes a flange 40 that extends radially outwardly from the end of head portion 30. Flange 40 may be continuous or may include a plurality of spaced flanges. Flange 40 provides a first abutment surface 42 that abuts a first wall 44 on wheel 12 to hold the position of hub 20 with respect to wheel 12 in a first direction.

Head portion 30 has a substantially cylindrical outer surface extending axially away from flange 40 substantially parallel with the centerline of hub 20. Head portion 30 defines a slot 50 extending perpendicular to the centerline of hub 20. Slot 50 includes a pair of branches 52 that merge together at the opening of slot 50. At the opening, body portion 30 defines a block 54 having an indentation 56 that allows the user to pick clip 22 out of slot 50. A second slot 58 intersects with slot 50 to provide access to clip 22 when clip 22 is fully inserted in slot 50. Branches 52 may extend entirely through head portion 30. A second block 60 is disposed at the exit of slot 50 on the opposite side of bore 36 than first block 54. Second block 60 includes catches 62 configured to lockingly receive the end of clip 22.

Slot 50 is configured to hold clip 22 in a secure arrangement before hub 20 is connected to wheel 12 and before hub 20 is connected to axle 14. Clip 22 includes a pair of extending arms 70 having axle holding areas 72 and hub holding areas 74. Clip 22 is insertible into slot 50 so that holding areas 72 are disposed in the intersection of slot 22 and bore 36. Holding areas 72 are used to snap into axle 14 and connect clip 22 (and thus hub 20) to axle 14. Clip 22 is held to hub 20 through the engagement of hub holding areas 74 with second block 60. Arms 70 may be resilient so that holding areas 74 clamp against block 60 when clip 22 is installed in slot 50 without axle 14.

In other embodiments of the invention, block 60 is not configured to lockingly receive clip 22 and a frictional fit is used to hold clip 22 with respect to hub 20.

Body portion 32 defines an attachment slot 80 that is used to securely connect hub 20 to wheel 12. Slot 80 is defined by second and third abutment walls 82 and 84 that hold hub 20 on wheel 12. Walls 82 and 84 are disposed substantially perpendicular to the longitudinal axis. When wheel 12 is attached to hub 10, walls 82 and 84 are disposed on either side of a pair of retaining ledges 86 that extend into a hub-receiving opening 88 defined by wheel 12. Ledges 86 extend into opening 88 from opposite sides of opening 88 and includes substantially flat inner surfaces 90.

Body portion 32 includes a pair of opposed, substantially parallel insertion surfaces 100 and a pair of opposed, substantially parallel locking surfaces 102. Locking surfaces 102 are substantially perpendicular to surfaces 100. In order to lock hub assembly 10 to wheel 12, surfaces are aligned with ledges 86. Surfaces 100 are spaced apart such that they may be aligned with retaining ledges 86 and hub 20 may be inserted into wheel 12 until slot 80 is aligned with ledges 86. Walls 42 and 44 are spaced to align ledges 86 with slot 80 when surfaces 42 and 44 abut each other. Locking surfaces 102 are spaced apart about the same distance as surfaces 90 so that a frictional, compressive fit is formed when hub 20 is rotated 90 degrees to place surfaces 102 in contact with surfaces 90. In this position, ledges 86 are trapped between abutment walls 82 and 84 and abutment surface 42 is abutting wall 44 so that hub 20 is securely locked on wheel 12. The frictional, compressive fit my be tight enough to require a simple wrench to achieve the 90 degree rotation.

Figure 12:
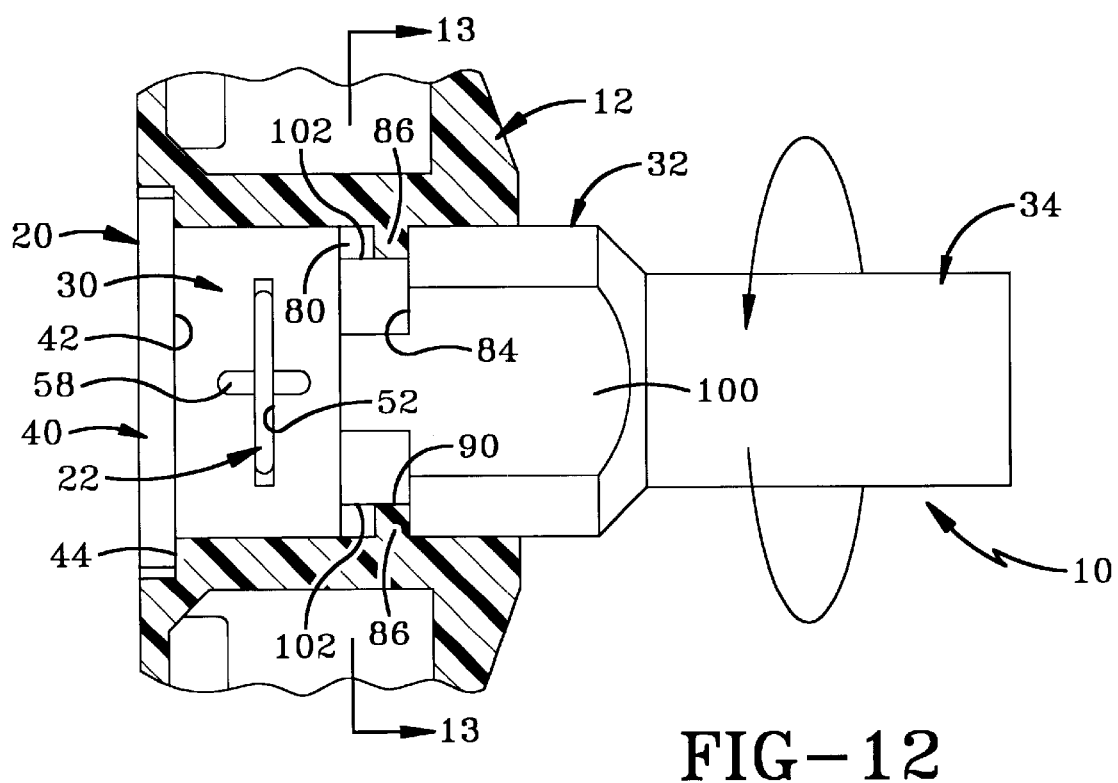
FIG. 12 is a view similar to FIG. 9 showing the hub being rotated into the locked position with respect to the wheel.
Figure 14:
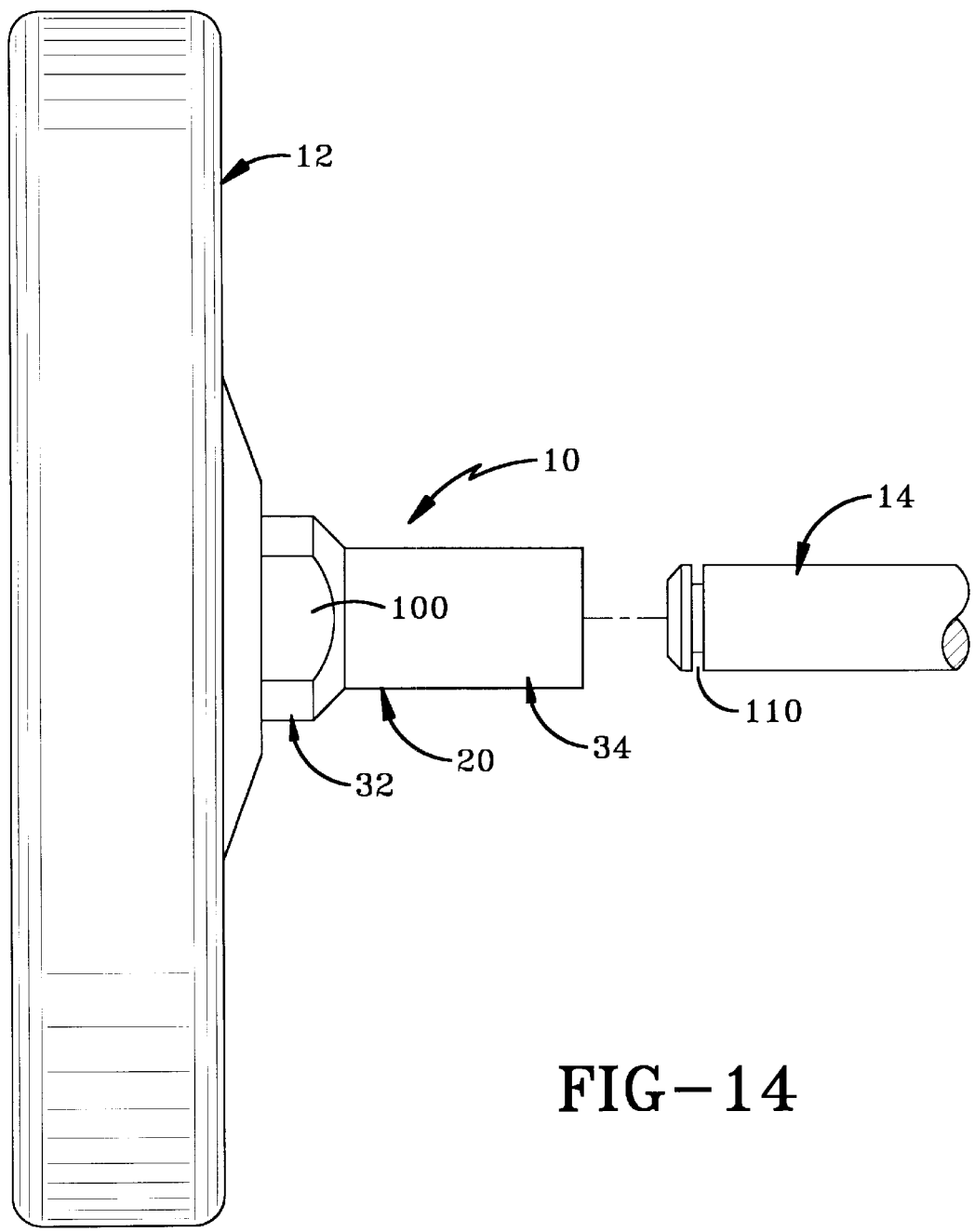
FIG. 14 is a side view of the wheel and hub assembly locked to the wheel with the axle being inserted into the hub assembly.
Figure 16:
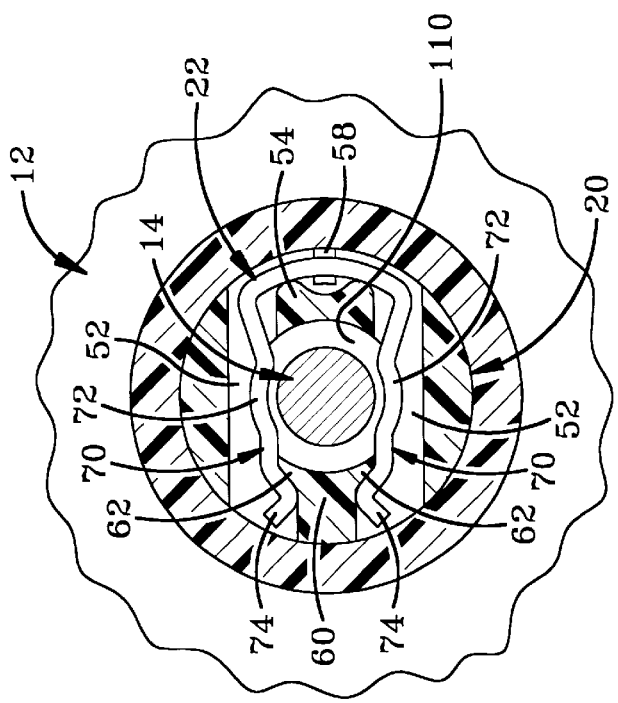
FIG. 16 is a section view taken along line 16—16 of FIG. 15.
Figure 15:
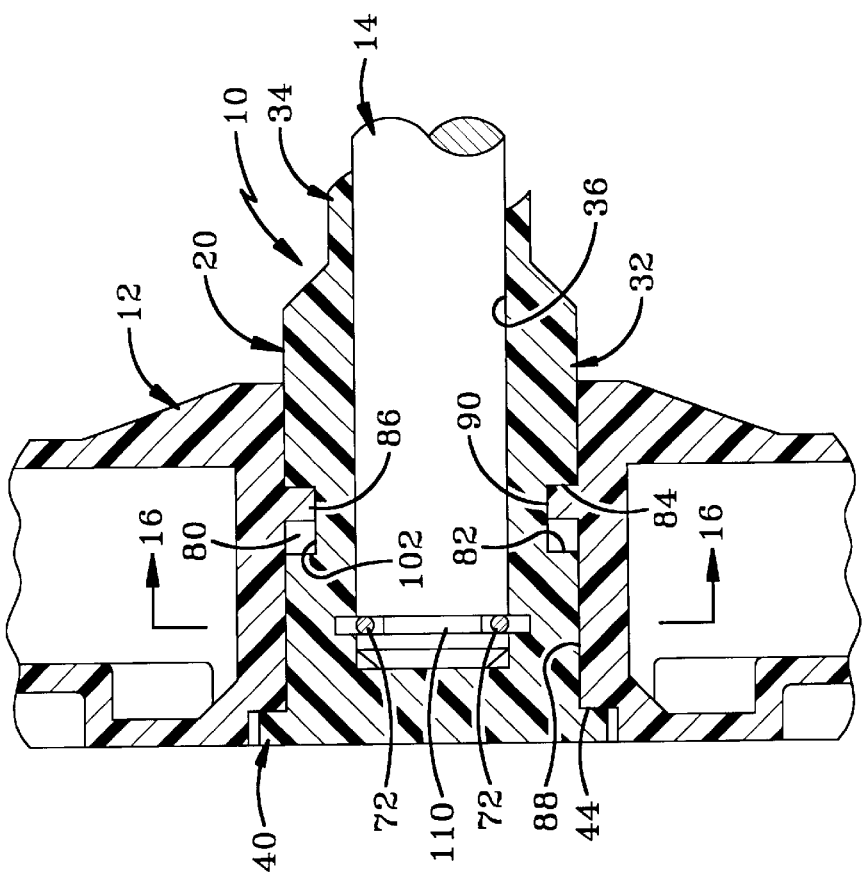
FIG. 15 is a section view of the hub assembly locked to the wheel and the axle locked to the hub assembly.

As may be seen in FIG. 12, surfaces 100 extend out away from wheel 12. The extension of these surfaces allows the user to grip hub 20 when removing hub 20 from wheel 12. The user may grip hub 20 with a wrench to hold hub 20 while the user rotates wheel 12.

Axle 14 includes a clip slot 110 adjacent the end of axle 14. The end is curved or beveled to allow the end of axle 14 to be forced against clip 22 to spread apart axle holding areas 72 to allow slot 110 to become aligned with clip 22. Once aligned, clip 22 snaps itself into slot 110 to connect hub 20 and axle 14. In the preferred embodiment of the invention, clip 22 does not resiliently engage axle 14 after axle 14 is installed on hub assembly 10.

Wheel 12 may be used on a trash can 130. Hub assembly 10 allows wheel 12 to be quickly and easily mounted to the trash can in an arrangement wherein wheel 12 cannot be readily removed from trash can 130. Wheel 12 cannot be readily removed because hub 20 is only exposed to wall 132 of trash can 130 that receives hub 20 and axle 14. Further, no obvious connectors are visible because head portion 30 has a closed end and slot 50 is hidden within wheel 12. A person thus cannot readily ascertain how to remove wheel 12 from axle 14.

Figure 17:
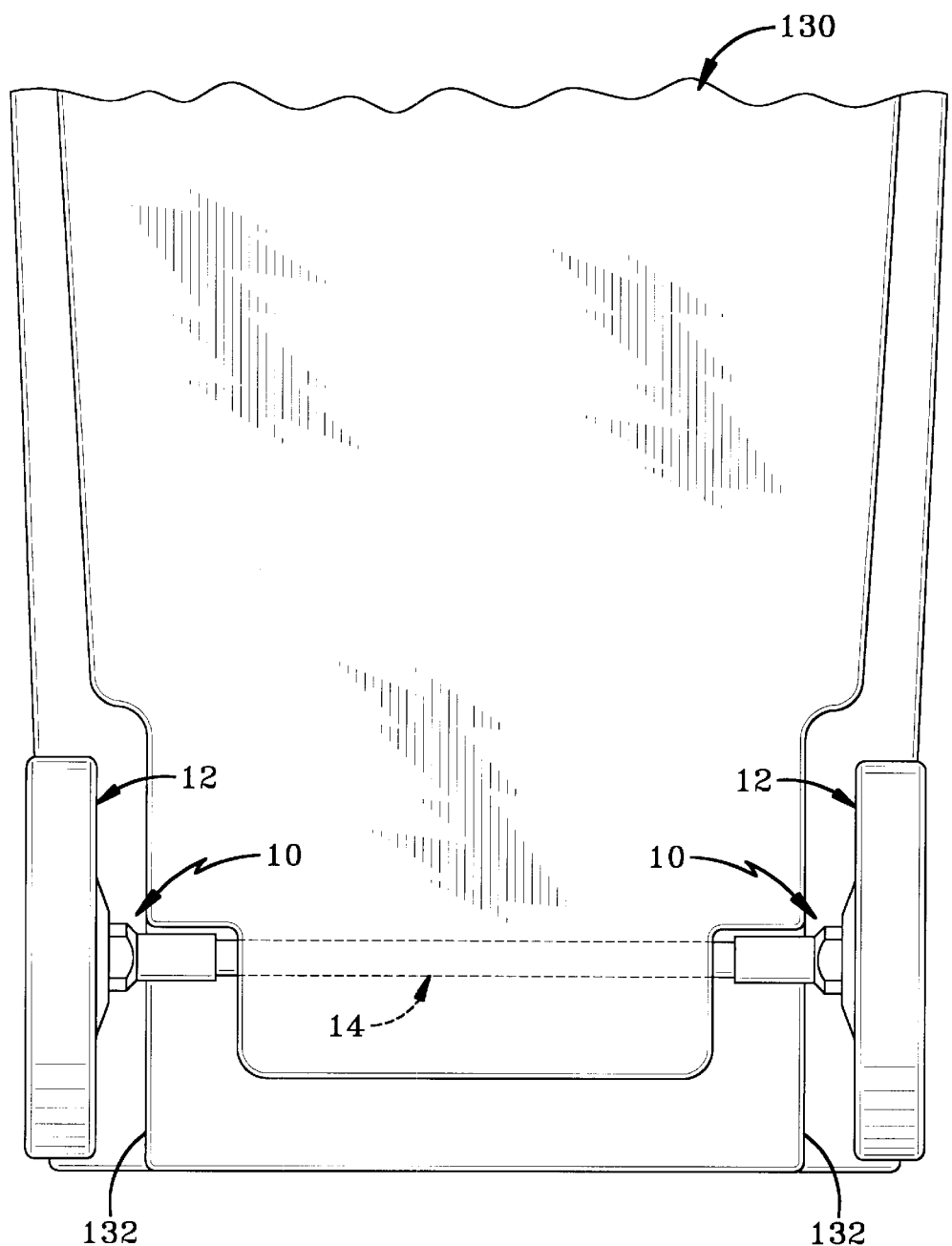
FIG. 17 is an elevation view of a trash can having two wheels connected to an axle with the locking wheel hub assemblies of the present invention.
Figure 17D:
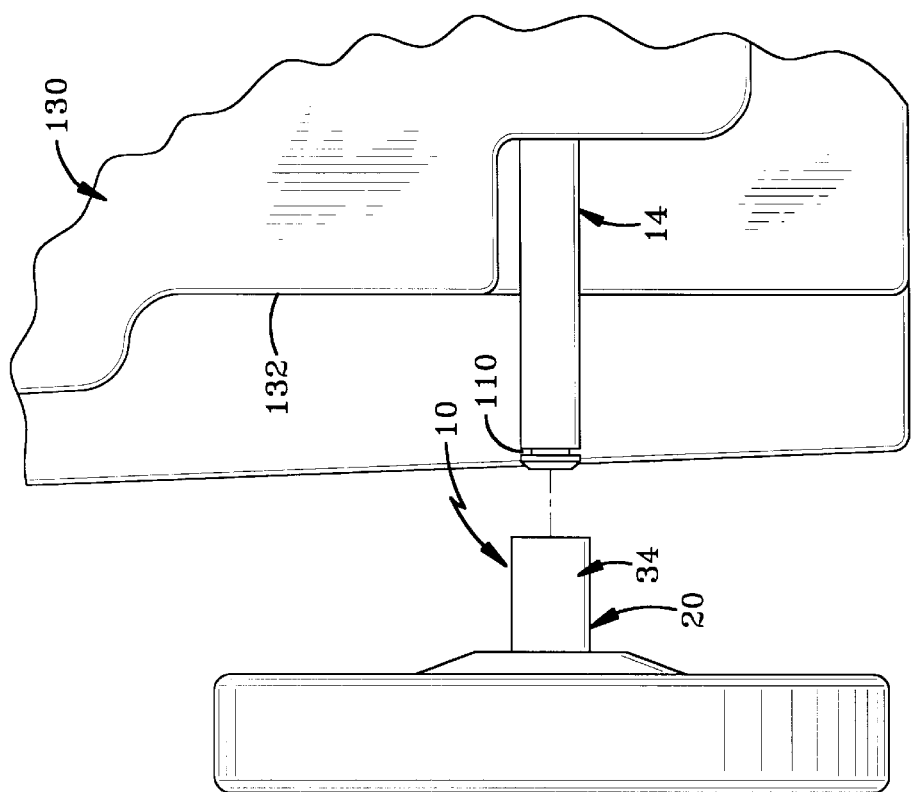
FIG. 17D is a view similar to FIG. 17A showing the locking wheel hub assembly and wheel being removed from the axle.
Figure 17C:
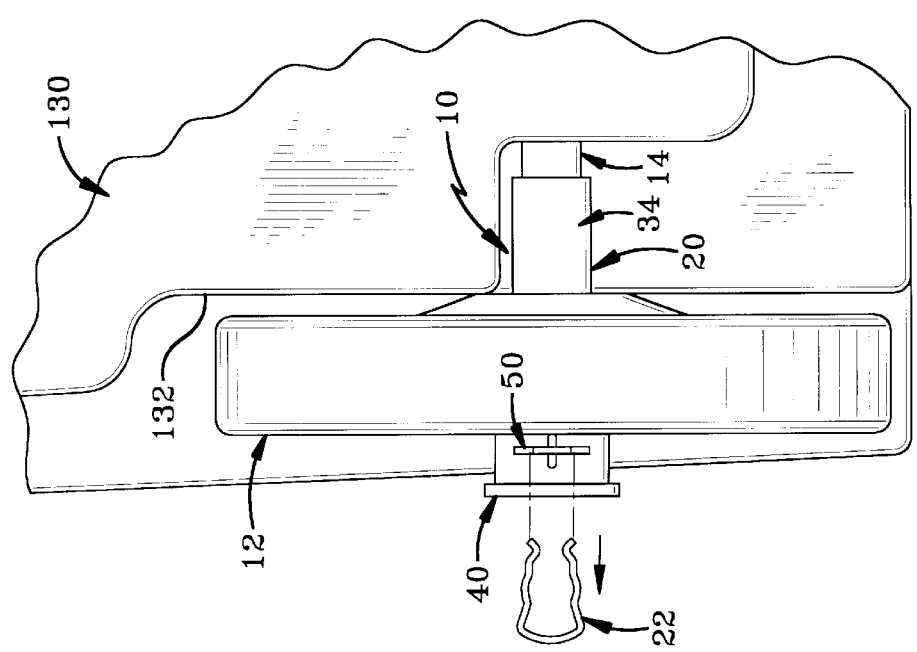
FIG. 17C is a view similar to FIG. 17A showing the clip being removed from the locking wheel hub assembly.
Figure 18:
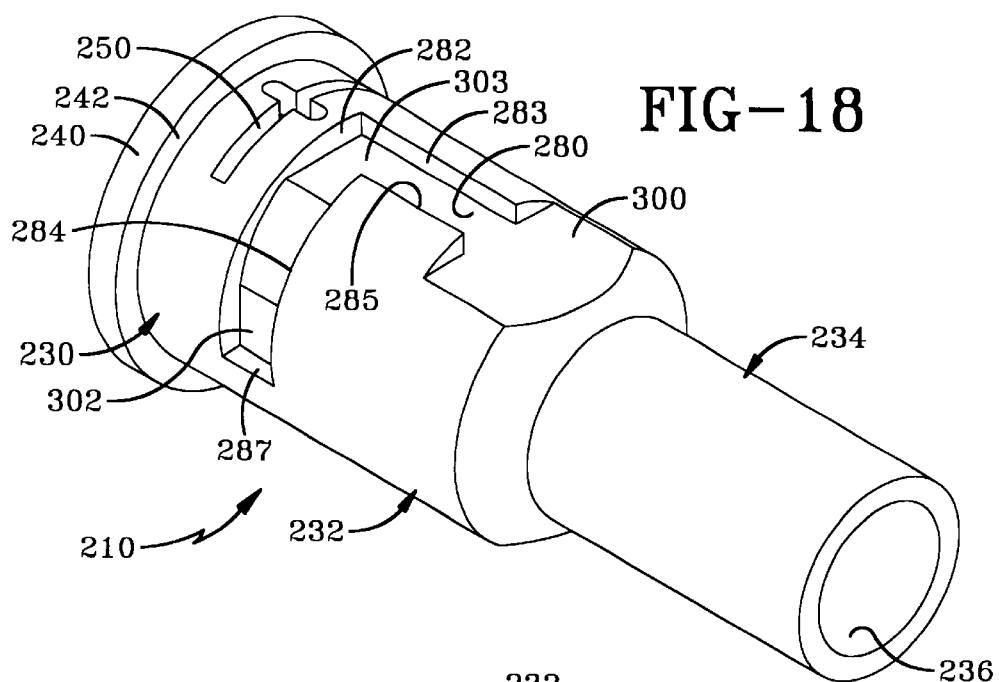
FIG. 18 is a perspective view of an alternative embodiment of the hub of the invention.
Figure 19:
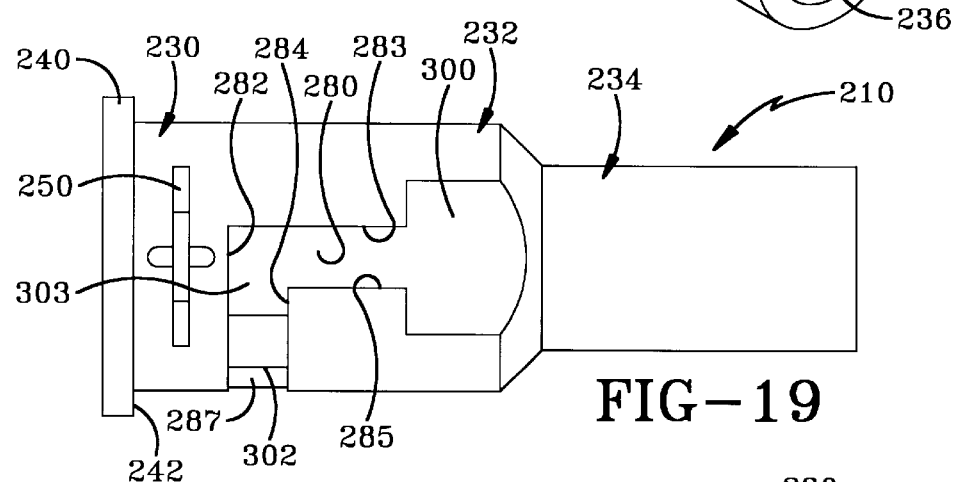
FIG. 19 is a front view of FIG. 18.
Figure 20:
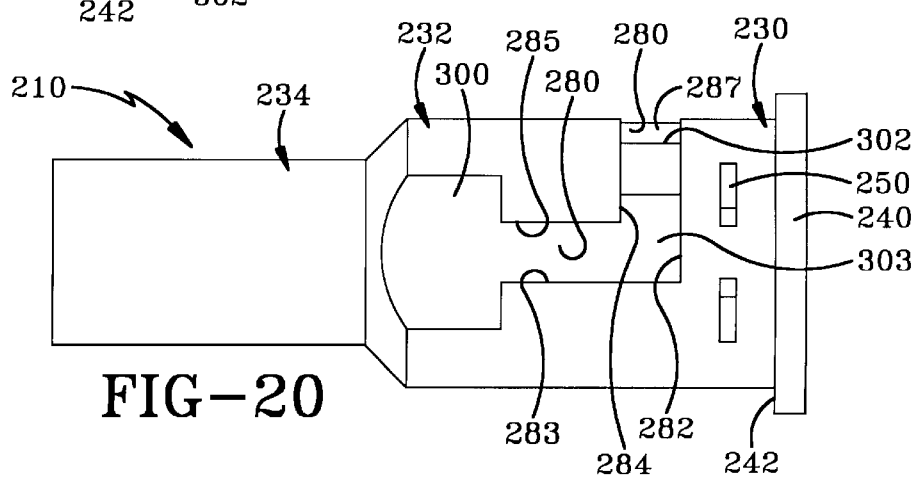
FIG. 20 is a rear view of FIG. 18.
Figure 24:
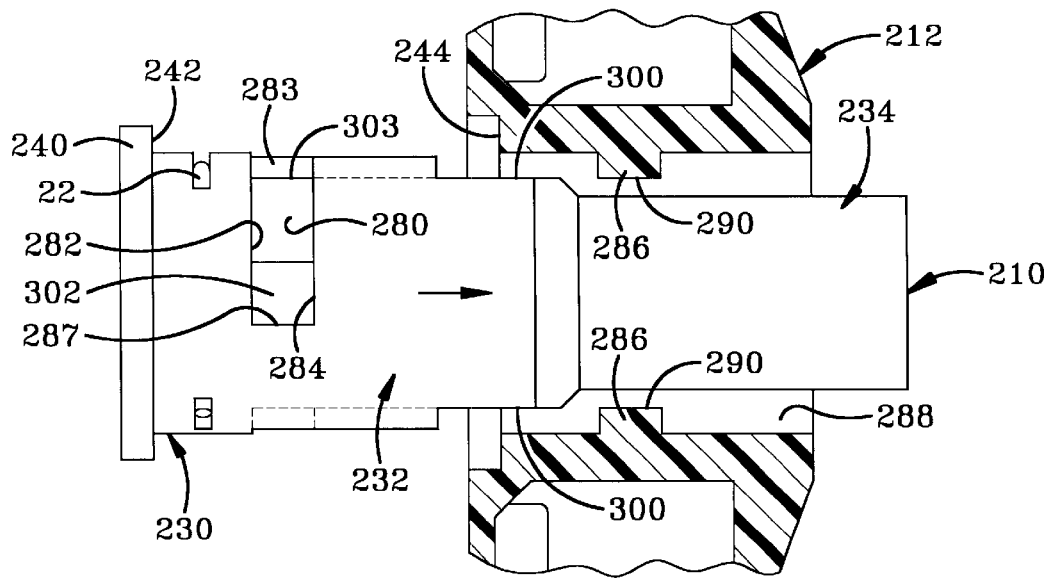
FIG. 24 is a side view, partially in section, of the FIG. 18 hub assembly being installed into the wheel.
Figure 25:
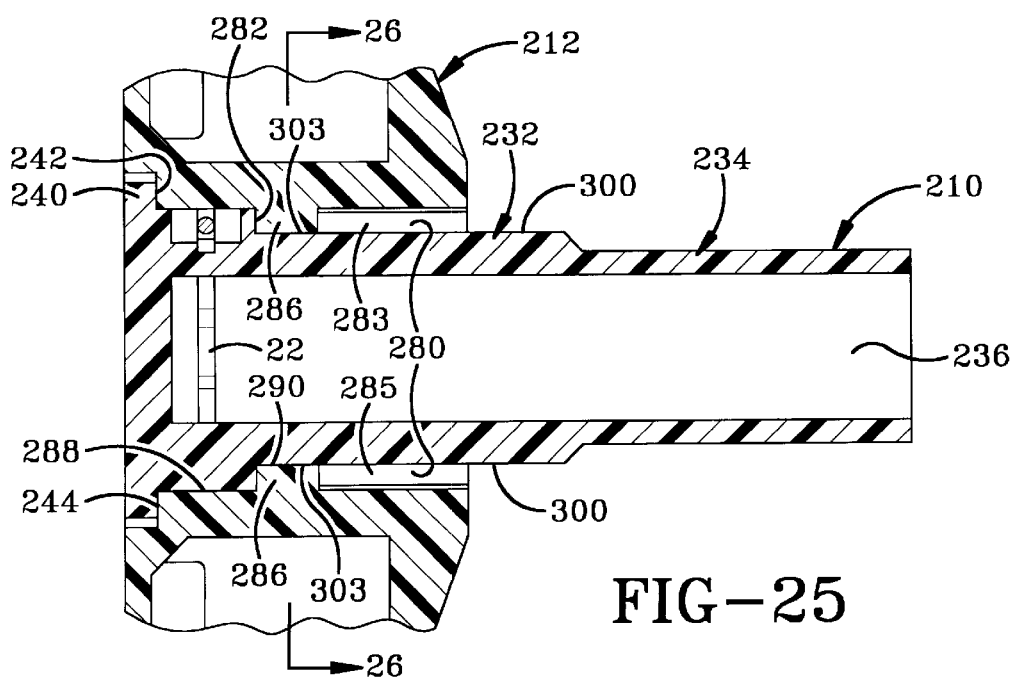
FIG. 25 is a section view of the FIG. 18 locking hub fully pushed into the wheel.
Figure 26:
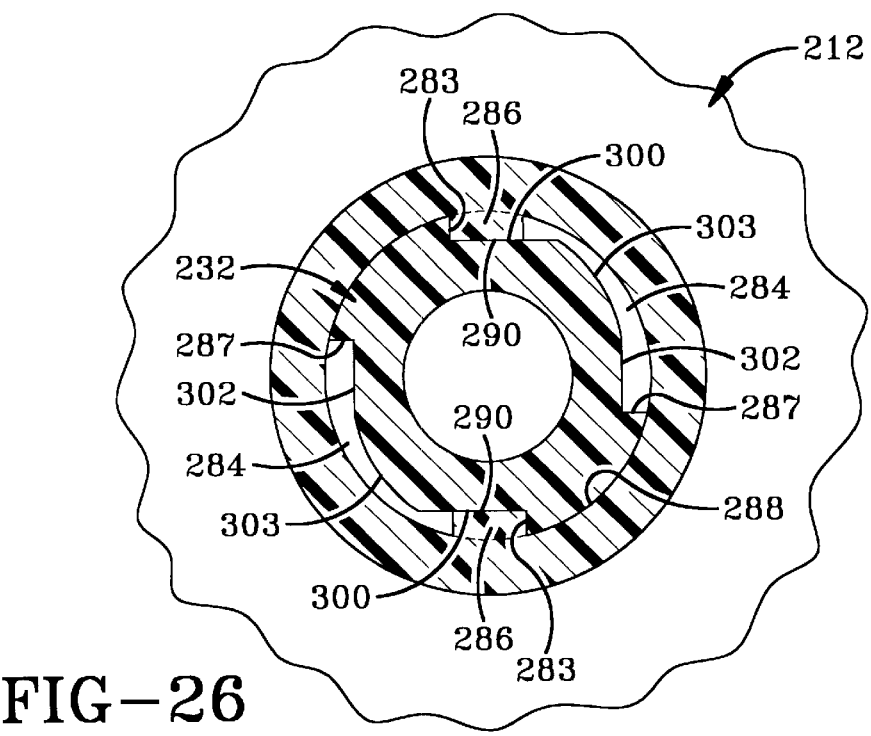
FIG. 26 is a section view taken along line 26—26 of FIG. 25.
Figure 28:
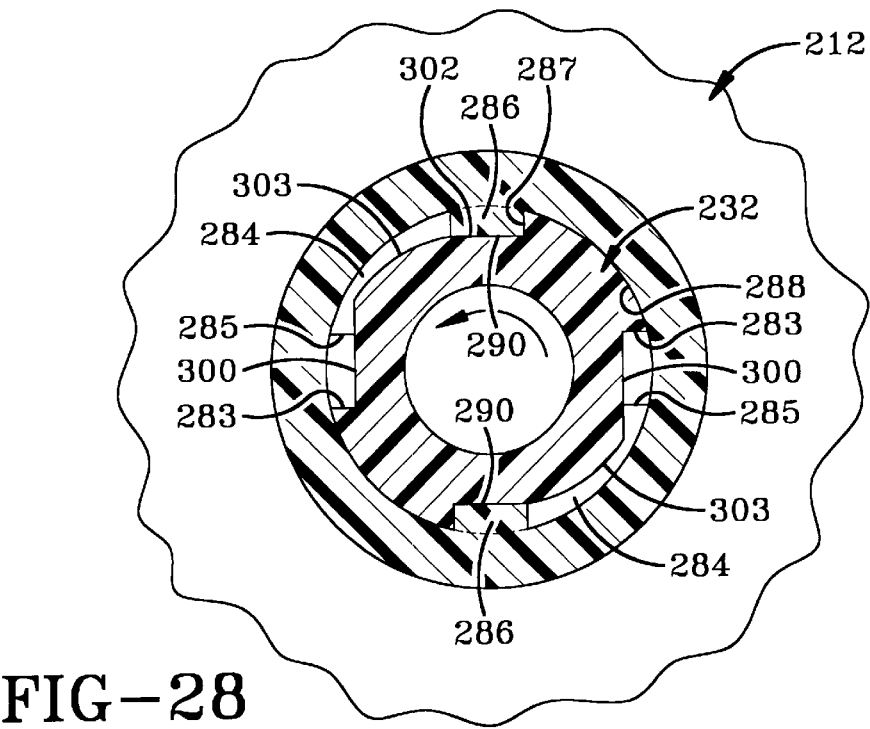
FIG. 28 is a section view taken along line 28—28 of FIG. 27.
Figure 27:
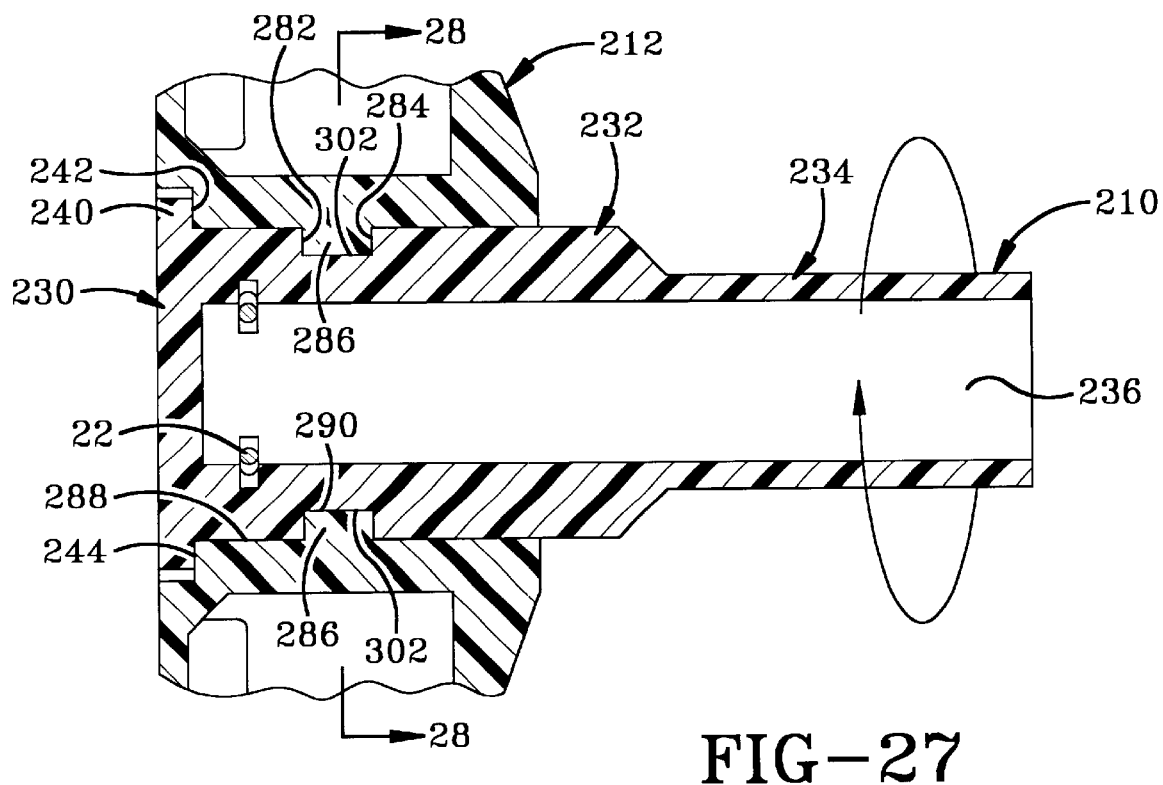
FIG. 27 is a view similar to FIG. 25 showing the locking hub rotated to the locked position.

Wheel 12 and hub assembly 10 may be removed from can 130 by following the method depicted in FIGS. 17A–17D. In FIG. 17A, wheel 12 is rotated with respect to hub 10 so that the bayonet-style connection between wheel 12 and hub 10 is broken. The user achieves the rotation by grasping hub 10 with a wrench and rotating wheel 12 with his hand while preventing hub 10 from rotating with the wrench. In this position, wheel 12 is forced inwardly toward wall 132 to expose slot 50. The wheel 12 on the opposite side of can 130 may be pushed inwardly to help expose slot 50. Once slot 50 is exposed, the user can pry clip 22 out of slot 50 as shown in FIG. 17C. The user may insert a small screw driver or awl into slot 50 (and particularly slot 58) to remove clip 22. Once clip 22 is removed, wheel 12 and hub 10 may be removed from axle 14 as shown in FIG. 17D.

The second embodiment of the hub assembly of the present invention is indicated generally by the numeral 210 in FIGS. 18–28. Hub assembly 210 is used to hold a wheel 212 on an axle 14 in an arrangement that allows axle 14 to rotate with respect to hub assembly 210 and wheel 212. In other embodiments, axle 14 is clamped to hub assembly 210 so that axle 14 rotates with hub assembly 210. Hub assembly 210 generally includes a hub 220 that is used with clip 22 that is described above. Hub 210 is configured to lock to wheel 212 while clip 22 is configured and arranged to connect hub 210 to axle 14.

Hub 210 includes a head portion 230, a body portion 232, and a foot portion 234. Portions 230, 232, and 234 may be integrally fabricated by molding portions 230, 232, and 234 together. Hub 210 may be fabricated from plastic or any of a variety of other materials known to those skilled in the art. Hub 210 defines an axle bore 236 having a longitudinal centerline.

Head portion 230 includes a flange 240 that extends radially outwardly from the end of head portion 230. Flange 240 may be continuous or may be defined by a plurality of spaced flange members. Flange 240 provides a first abutment surface 242 that abuts a first wall 244 on wheel 212 to hold the position of hub assembly 210 with respect to wheel 212 in a first direction. Flange 40 prevents hub assembly 210 from passing through wheel 212.

Head portion 230 has a substantially cylindrical outer surface extending axially away from flange 240. The cylindrical outer surface is centered about the centerline of hub 210. Head portion 230 defines a slot 250 extending perpendicular to the centerline of hub 210. Slot 250 includes a structure that is the same as, or similar to, slot 50 described above. Slot 250 is configured to hold clip 22 in a secure arrangement before hub 210 is connected to wheel 212 and before hub 210 is connected to axle 14.

Body portion 232 defines an attachment slot 280 that is used to securely connect hub 210 to wheel 212. In this embodiment, slot 280 is "L" shaped with a first portion disposed perpendicular to the centerline of the hub and a second portion disposed parallel to the centerline of the hub. The first portion of slot 280 is defined by second and third abutment walls 282 and 284 that hold hub 210 on wheel 212. The second portion of slot 280 is defined by fourth and fifth abutment walls 283 and 285. A stop wall 287 extends between walls 282 and 284 to form the end of slot 280. When hub assembly 210 is connected to wheel 212, abutment walls 282 and 284 are disposed on either side of a pair of retaining ledges 286 that extend into a hub-receiving opening 288 defined by wheel 212. Ledges 286 extend into opening 288 from opposite sides of opening 288 and include substantially flat inner surfaces 290.

Body portion 232 includes a pair of opposed, substantially parallel insertion surfaces 300 and a pair of opposed, substantially parallel locking surfaces 302. Locking surfaces 302 are substantially perpendicular to surfaces 300 and are disposed adjacent stop walls 287. Surfaces 300 are spaced apart such that they may be aligned with and may pass between retaining ledges 286. In order to lock hub assembly 210 to wheel 212, the user first aligns the second portion of slots 280 with ledges 286. Hub assembly 210 may be inserted into wheel 212 until ledges 286 engage abutment wall 282 and are aligned with the first portion of slot 280. In this position, abutment surface 242 abuts wall 244 so that hub 210 is securely locked on wheel 212. The user then rotates wheel 212 90 degrees to lock wheel 212 to hub assembly 210.

Locking surfaces 302 are spaced apart about the same distance as surfaces 290 so that a frictional, compressive fit is formed when hub 210 is rotated 90 degrees to place surfaces 302 in contact with surfaces 290. In this position, ledges 286 are trapped between abutment walls 282 and 284 and against stop wall 287.

The bottom surface 303 of the first portion of slot 280 includes a shallow middle portion that must be forced over ledge 286 when hub assembly is rotated to the locked position. The spacing between the two opposed middle portions is slightly greater than the distance between the two opposed surfaces 290 requiring the elements to deform when wheel 212 is rotated to the locked position. The middle portion of bottom surface 303 and stop wall 287 cooperate to hold ledge 286 in the locked position.

In a manner similar to that shown in FIG. 12, surfaces 300 are configured to extend out away from wheel 212 when hub assembly 210 is in the locked position. The extension of these surfaces allows the user to grip hub 210 when removing hub assembly 210 from wheel 212.

Wheel 212 may be used on a trash can 130 as described above with respect to the first embodiment of the invention. Hub assembly 210 allows wheel 212 to be quickly and easily mounted to the trash can in an arrangement wherein wheel 212 cannot be readily removed from trash can 130. Wheel 212 cannot be readily removed because hub assembly 210 is only exposed to wall 132 of trash can 130 that receives hub 210 and axle 14. Further, no obvious connectors are visible because head portion 230 has a closed end and slot 250 is hidden within wheel 212. Wheel 212 and hub assembly 210 may be removed from can 130 by following the method depicted in FIGS. 17A–17D.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A locking hub adapted to connect a wheel to an axle; the wheel including an opening with at least one retaining ledge extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the slot; a portion of the clip being disposed in the bore and adapted to engage the axle; and the body defining at least one attachment slot adapted to lockingly receive the retaining ledge of the wheel in a slide and twist-style locking connection to lock the hub to the wheel.

2. The locking hub of claim 1, wherein the reference plane being disposed substantially perpendicular to the longitudinal axis of the bore.

3. The locking hub of claim 1, further comprising a flange connected to the body; the flange adapted to prevent the body from passing through the wheel opening.

4. The locking hub of claim 3, wherein the flange is spaced from the attachment slot such that the attachment slot is aligned with the wheel ledge when the flange engages the wheel.

5. The locking hub of claim 1, wherein the clip includes opposed arms that are disposed across the bore on either side on the longitudinal axis; the opposed arms adapted to engage the axle.

6. The locking hub of claim 1, wherein the attachment slot has a locking portion disposed substantially perpendicular to the longitudinal axis of the bore; the retaining ledge being disposed in the locking portion of the attachment slot when the retaining ledge is locking received by the attachment slot.

7. The locking hub of claim 6, wherein the attachment slot is L-shaped.

8. The locking hub of claim 6, further comprising a stop disposed across at least a portion of the attachment slot.

9. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body defining an attachment slot adapted to lockingly receive the retaining ledges of the wheel to lock the hub to the wheel; and the body defining a catch adjacent the first slot; the clip engaging the catch to hold the clip to the body.

10. The locking hub of claim 9, wherein the clip resiliently engages the catch.

11. The locking hub of claim 9, wherein the first catch is disposed within the body.

12. The locking hub of claim 9, wherein the attachment slot includes a first portion disposed substantially perpendicular to a second portion.

13. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body defining an attachment slot adapted to lockingly receive the retaining ledges of the wheel to lock the hub to the wheel; and the body defining a pair of opposed catches adjacent the first slot; the clip resiliently engaging the catches to hold the clip to the body.

14. The locking hub of claim 13, wherein the opposed catches are disposed within the body.

15. The locking hub of claim 13, wherein the attachment slot includes a first portion disposed substantially perpendicular to a second portion.

16. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the slot; a portion of the clip being disposed in the bore and adapted to engage the axle;

the body defining at least one attachment slot adapted to lockingly receive the retaining ledges of the wheel in a bayonet-style locking connection to lock the hub to the wheel; and the body including a flange adapted to engage the wheel to prevent the body from passing through the opening of the wheel.

17. The locking hub of claim 16, wherein the slot is spaced from the flange a distance that is adapted to align the slot with the ledges when the flange engages the wheel.

18. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body including a flange adapted to engage the wheel to prevent the body from passing through the opening of the wheel;

the body defining an attachment slot adapted to lockingly receive the retaining ledges of the wheel to lock the hub to the wheel;

the attachment slot being spaced from the flange a distance that is adapted to align the attachment slot with the retaining ledges of the wheel when the flange engages the wheel; and the body defining a stop wall that extends at least partially across the attachment slot.

19. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body including a flange adapted to engage the wheel to prevent the body from passing through the opening of the wheel;

the body defining an attachment slot adapted to lockingly receive the retaining ledges of the wheel to lock the hub to the wheel;

the attachment slot being spaced from the flange a distance that is adapted to align the attachment slot with the retaining ledges of the wheel when the flange engages the wheel; and the attachment slot including a first portion disposed substantially perpendicular to the longitudinal centerline of the bore and a second portion that extends substantially parallel to the longitudinal centerline of the bore.

20. The locking hub of claim 19, wherein the body defines a stop wall that at least partially extends across the second portion of the slot.

21. The locking hub of claim 20, wherein the body includes a bottom wall that partially defines the second portion of the slot; the bottom wall having a middle portion that cooperates with the stop wall to lock the wheel in the slot.

22. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body defining an attachment slot adapted to lockingly receive the retaining ledges of the wheel to lock the hub to the wheel; and the body defining a second slot that intersects the first slot to allow the clip to be removed from the first slot.

23. The locking hub of claim 22, wherein the second slot is disposed substantially perpendicular to the first slot.

24. The locking hub of claim 23, wherein the second slot does not extend to the bore.

25. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the slot; a portion of the clip being disposed in the bore and adapted to engage the axle; the clip including opposed arms that are disposed across the bore on either side on the longitudinal axis; the opposed arms adapted to engage the axle; and the body defining at least one attachment slot adapted to lockingly receive the retaining ledges of the wheel in a bayonet-style locking connection to lock the hub to the wheel.

26. A wheel assembly comprising:

a wheel;

an axle;

a locking hub connected to the wheel to the axle;

the wheel defining an opening that receives a portion of the locking hub;

the wheel including a pair of retaining ledges extending out into the opening; the retaining ledges being separate and spaced apart;

the locking hub defining a bore that receives a portion of the axle; the bore having a longitudinal axis;

the body of the locking hub defining a first slot disposed in a reference plane that intersects the longitudinal axis of the bore;

a clip disposed in the first slot; a portion of the clip being disposed in the bore and adapted to engage the axle; and the body of the locking hub defining an attachment slot adapted to lockingly receive the retaining ledges of the wheel to lock the hub to the wheel; the attachment slot having a locking portion disposed substantially perpendicular to the longitudinal axis of the bore; the retaining ledges being disposed in the locking portion of the attachment slot when the retaining ledges are locking received by the attachment slot.

27. The wheel assembly of claim 26, further comprising a flange connected to the body; the flange adapted to prevent the body from passing through the wheel opening.

28. The wheel assembly of claim 27, wherein the flange is spaced from the attachment slot such that the attachment slot is aligned with the wheel edge when the flange engages the wheel.

29. The wheel assembly of claim 26, wherein the clip includes opposed arms that are disposed across the bore on either side on the longitudinal axis; the opposed arms adapted to engage the axle.

30. The wheel assembly of claim 26, further comprising a stop disposed across at least a portion of the attachment slot.

31. A wheel assembly comprising:

a wheel;

an axle;

a locking hub connecting the wheel to the axle such that the wheel will rotate on the axle;

the wheel defining an opening that receives a portion of the locking hub;

the wheel including a pair of retaining ledges extending out into the opening;

the locking hub defining a bore that receives a portion of the axle; the bore having a longitudinal axis;

the body of the locking hub defining a first slot disposed in a reference plane that intersects the longitudinal axis of the bore;

a clip disposed in the first slot; a portion of the clip being disposed in the bore and adapted to engage the axle; the body of the locking hub defining an attachment slot adapted to lockingly receive the retaining ledges of the wheel to lock the hub to the wheel; and the body defining a catch adjacent the first slot; the clip engaging the catch to hold the clip to the body of the locking hub.

32. The wheel of claim 31, wherein the clip resiliently engages the catch.

33. The wheel assembly of claim 31, wherein the first catch is disposed within the body.

34. The wheel assembly of claim 31, wherein the attachment slot includes a first portion disposed substantially perpendicular to a second portion.

35. A wheel assembly comprising:

a wheel;

an axle;

a locking hub connecting the wheel to the axle such that the wheel will rotate on the axle;

the wheel defining an opening that receives a portion of the locking hub;

the wheel including a pair of retaining ledges extending out into the opening;

the locking hub defining a bore that receives a portion of the axle; the bore having a longitudinal axis;

the body of the locking hub defining a first slot disposed in a reference plane that intersects the longitudinal axis of the bore;

a clip disposed in the first slot; a portion of the clip being disposed in the bore and adapted to engage the axle; the body of the locking hub defining an attachment slot adapted to lockingly receive the retaining ledges of the wheel to lock the hub to the wheel; and the body defining a pair of opposed catches adjacent the first slot; the clip resiliently engaging the catches to hold the clip to the body of the locking hub.

36. The wheel assembly of claim 35, wherein the opposed catches are disposed within the body.

37. The wheel assembly of claim 35, wherein the attachment slot includes a first portion disposed substantially perpendicular to a second portion.

38. A wheel assembly comprising:
a wheel;
an axle;
a locking hub connected to the wheel to the axle such that the wheel will rotate on the axle;
the wheel defining an opening that receives a portion of the locking hub;
the wheel including a pair of retaining ledges extending out into the opening;
the retaining ledges being separate and spaced apart;
the locking hub defining a bore that receives a portion of the axle; the bore having a longitudinal axis;
the body of the locking hub defining a first slot disposed in a reference plane that intersects the longitudinal axis of the bore;
a clip disposed in the first slot; a portion of the clip being disposed in the bore and adapted to engage the axle;
the body of the locking hub defining an attachment slot adapted to lockingly receive the retaining ledges of the wheel to lock the hub to the wheel; and
the body including a flange adapted to engage the wheel to prevent the body from passing through the opening of the wheel.

39. The wheel of claim 38, wherein the slot is spaced from the flange a distance that is adapted to align the slot with the ledges when the flange engages the wheel.

40. A wheel assembly comprising:
a wheel
an axle;
a locking hub connecting the wheel to the axle such that the wheel will rotate on the axle;
the wheel defining an opening that receives a portion of the locking hub;
the wheel including a pair of retaining ledges extending out into the opening;
the locking hub defining a bore that receives a portion of the axle; the bore having a longitudinal axis;
the body of the locking hub defining a first slot disposed in a reference plane that intersects the longitudinal axis of the bore;
a clip disposed in the first slot; a portion of the clip being disposed in the bore and adapted to engage the axle; the body of the locking hub defining an attachment slot adapted to lockingly receive the retaining ledges of the wheel to lock the hub to the wheel;
the body of the locking hub including a flange adapted to engage the wheel to prevent the body of the locking hub from passing through the opening of the wheel;
the attachment slot being spaced from the flange a distance that is adapted to align the attachment slot with the retaining ledges of the wheel when the flange of the locking hub engages the wheel; and
the body of the locking hub defining a stop wall that at least partially extends across the attachment slot.

41. A wheel assembly comprising:
a wheel;
an axle;
a locking hub connecting the wheel to the axle such that the wheel will rotate on the axle;
the wheel defining an opening that receives a portion of the locking hub;
the wheel including a pair of retaining ledges extending out into the opening;
the locking hub defining a bore that receives a portion of the axle; the bore having a longitudinal axis;
the body of the locking hub defining a first slot disposed in a reference plane that intersects the longitudinal axis of the bore;
a clip disposed in the first slot; a portion of the clip being disposed in the bore and adapted to engage the axle; the body of the locking hub defining an attachment slot adapted to lockingly receive the retaining ledges of the wheel to lock the hub to the wheel;
the body of the locking hub including a flange adapted to engage the wheel to prevent the body of the locking hub from passing through the opening of the wheel;
the attachment slot being spaced from the flange a distance that is adapted to align the attachment slot with the retaining ledges of the wheel when the flange of the locking hub engages the wheel; and
the attachment slot including a first portion disposed substantially perpendicular to the longitudinal centerline of the bore and a second portion that extends substantially parallel to the longitudinal centerline of the bore.

42. The wheel of claim 41, wherein the body defines a stop wall that extends across the second portion of the slot.

43. The wheel of claim 42, wherein the body includes a bottom wall that partially defines the second portion of the slot; the bottom wall having a middle portion that cooperates with the stop wall to lock the wheel in the slot.

44. A wheel assembly comprising:
a wheel;
an axle;
a locking hub connected to the wheel to the axle such that the wheel will rotate on the axle;
the wheel defining an opening that receives a portion of the locking hub;
the wheel including a pair of retaining ledges extending out into the opening;
the retaining ledges being separate and spaced apart;
the locking hub defining a bore that receives a portion of the axle; the bore having a longitudinal axis;
the body of the locking hub defining a first slot disposed in a reference plane that intersects the longitudinal axis of the bore;
a clip disposed in the first slot; a portion of the clip being disposed in the bore and adapted to engage the axle; the clip including opposed arms that are disposed across the bore on either side of the longitudinal axis; the opposed arms adapted to engage the axle; and
the body of the locking hub defining an attachment slot adapted to lockingly receive the retaining ledges of the wheel to lock the hub to the wheel.

45. A trash container comprising:
a trash container;
a pair of axles connected to the trash container;
a locking hub connected to each axle;
a wheel connected to each locking hub; the wheel being rotatable with respect to the trash container;
each wheel defining an opening that receives a portion of the locking hub;

each wheel including a pair of retaining ledges extending out into the opening;

each locking hub having a body that defines a bore that receives a portion of one of the axles; the bore having a longitudinal axis;

the body defining a first slot disposed in a reference plane that intersects the longitudinal axis of the bore;

a clip disposed in the first slot; a portion of the clip being disposed in the bore;

each axle defining an axle slot;

a portion of each clip being disposed in one of the axle slots of the axle; and the body defining an attachment slot adapted to lockingly receive the retaining ledges of the wheel to lock the hub to the wheel; the attachment slot having a locking portion disposed substantially perpendicular to the longitudinal axis of the bore; the retaining ledges being disposed in the locking portion of the attachment slot when the retaining ledges are locking received by the attachment slot.

46. The trash container of claim 45, wherein the attachment slot includes a first portion and a second portion; the first portion being substantially perpendicular to the second portion.

47. The trash container of claim 46, wherein the body of the locking hub includes a flange adapted to engage the wheel to prevent the body of the locking hub from passing through the opening of the wheel;

the first attachment slot portion being spaced from the flange a distance that is adapted to align the first attachment slot portion with the retaining ledges of the wheel when the flange of the locking hub engages the wheel.

48. The trash container of claim 46, wherein the body of the locking hub includes a stop disposed across the first attachment slot portion.

49. A method of connecting a wheel to an axle with a locking hub comprising the steps of:

(a) inserting a portion of the locking hub into the wheel so that the locking hub is in an unlocked position;

(b) rotating the locking hub from the unlocked position to a locked position;

(c) connecting the locking hub to the axle; and (d) inserting a clip into the locking hub before the locking hub is inserted into the wheel; the clip adapted to connect the locking hub to the axle.

50. The method of claim 49, wherein step (c) includes the step of engaging the axle with the clip to hold the axle to the locking hub.

51. The method of claim 50, further including the step of resiliently forcing the clip open when the axle is being engaged with the clip.

52. The method of claim 49, wherein step (c) occurs before steps (a) and (b).

53. The method of claim 49, wherein step (c) occurs after steps (a) and (b).

54. A locking hub adapted to connect a wheel to an axle such that the wheel will rotate on the axle; the wheel including an opening with a pair of retaining ledges extending out into the opening; the locking hub comprising:

a body defining a bore adapted to receive the axle; the bore having a longitudinal axis;

the body defining a first slot disposed in a reference plane that intersects the longitudinal axis of the bore;

a clip disposed in the first slot; a portion of the clip being disposed in the bore and adapted to engage the axle;

the body defining an attachment slot adapted to lockingly receive the retaining ledges of the wheel to lock the hub to the wheel;

the body including a flange adapted to engage the wheel to prevent the body from passing through the opening of the wheel;

the attachment slot being spaced from the flange a distance that is adapted to align the attachment slot with the retaining ledges of the wheel when the flange engages the wheel; and the body defining a stop that extends at least partially across the attachment slot.

55. The locking hub of claim 54, wherein the attachment slot includes a first portion disposed substantially perpendicular to a second portion.

56. A trash container comprising:

a trash container;

a pair of axles connected to the trash container;

a locking hub connected to each axle;

a wheel connected to each locking hub; the wheel being rotatable with respect to the trash container;

each wheel defining an opening that receives a portion of the locking hub;

each wheel including at least one retaining ledge extending out into the opening;

each locking hub having a body that defines a bore that receives a portion of one of the axles; the bore having a longitudinal axis;

each axle being connected to one of the locking hubs; and the body defining an attachment slot adapted to lockingly receive the retaining ledge of the wheel to lock the hub to the wheel; the attachment slot having at least a circumferential portion;

the body having a stop that extends at least partially across the circumferential portion of the attachment slot;

the body having a bottom wall that defines at least a portion of the circumferential portion of the attachment slot; and the bottom wall having a middle portion that cooperates with the stop to lock the wheel to the locking hub by trapping the retaining ledge intermediate the stop and the middle portion of the bottom wall.

57. The trash container of claim 56, wherein the attachment slot includes a longitudinal portion disposed substantially perpendicular to the circumferential portion.

58. The trash container of claim 57, wherein a clip is used to connect the axle to the locking hub.

59. A wheel assembly comprising:

a wheel;

an axle;

a locking hub connecting the wheel to the axle;

the wheel defining an opening that receives a portion of the locking hub;

the wheel including at least one retaining ledge extending out into the opening;

the locking hub defining a bore that receives a portion of the axle; the bore having a longitudinal axis;

the axle being connected to the locking hub;

the locking hub defining an attachment slot that locking receives the retaining ledge of the wheel to lock the locking hub to the wheel;

the attachment slot including a first portion disposed substantially perpendicular to the longitudinal centerline of the bore and a second portion that extends substantially parallel to the longitudinal centerline of the bore.

60. The wheel assembly of claim 59, further comprising a stop that extends at least partially across the first portion of the attachment slot.

61. The wheel assembly of claim 60, wherein the stop extends at least partially across the first portion of the attachment slot.

62. The wheel assembly of claim 60, wherein the locking hub has a bottom wall that defines at least a portion of the first portion of the attachment slot; and the bottom wall having a middle portion that cooperates with the stop to lock the wheel to the locking hub by trapping the retaining ledge intermediate the stop and the middle portion of the bottom wall.

63. A trash container comprising:

a trash container;

a pair of axles connected to the trash container;

a locking hub connected to each axle;

a wheel connected to each locking hub; the wheel being rotatable with respect to the trash container;

each wheel defining an opening that receives a portion of the locking hub;

each wheel including at least one retaining ledge extending out into the opening;

each locking hub having a body that defines a bore that receives a portion of one of the axles; the bore having a longitudinal axis;

each axle being connected to one of the locking hubs; and the body defining an attachment slot adapted to lockingly receive the retaining ledge of the wheel to lock the hub to the wheel; the attachment slot having at least a circumferential portion;

the body having a bottom wall that defines at least a portion of the circumferential portion of the attachment slot; and the bottom wall having a middle portion adapted to lock the wheel to the locking hub.

64. The trash container of claim 63, wherein the attachment slot includes a longitudinal portion disposed substantially perpendicular to the circumferential portion.

65. The trash container of claim 63, wherein a clip is used to connect the axle to the locking hub; the clip having opposed arms that snap onto the axle.

* * * * *